R. A. FESSENDEN.
DETECTING DEVICE FOR WIRELESS TELEGRAPHY.
APPLICATION FILED MAR. 26, 1907. RENEWED FEB. 11, 1909.

917,574. Patented Apr. 6, 1909.

Witness:
O. M. Clarke
Fred Staub

Inventor;
Reginald A. Fessenden,
By F. W. H. Clay att'y.

UNITED STATES PATENT OFFICE.

REGINALD A. FESSENDEN, OF BRANT ROCK, MASSACHUSETTS.

DETECTING DEVICE FOR WIRELESS TELEGRAPHY.

No. 917,574.        Specification of Letters Patent.        Patented April 6, 1909.

Application filed March 26, 1907, Serial No. 364,626. Renewed February 11, 1909. Serial No. 477,453.

*To all whom it may concern:*

Be it known that I, REGINALD A. FESSENDEN, a citizen of the United States, residing at Brant Rock, in the county of Plymouth and State of Massachusetts, have invented a certain new and useful Detecting Device for Wireless Telegraphy, of which the following is a specification.

My invention relates to the art of transmitting intelligence by electro-magnetic energy, and more particularly to detectors for the received oscillations.

The primary objects of my invention are, to utilize certain effects upon conductors in moving frictional contact caused by electromagnetic waves for detecting such waves; to provide a receiver of superior sensitiveness, uniformity of action and simplicity of construction; to adapt such receiver for amplifying and for making various kinds of records of received waves, and to generally improve the operation of the receiving circuit. These objects, and other advantages which will hereinafter appear, are attained by apparatus such as shown for illustration in the accompanying drawings, wherein,—

Figure 1:
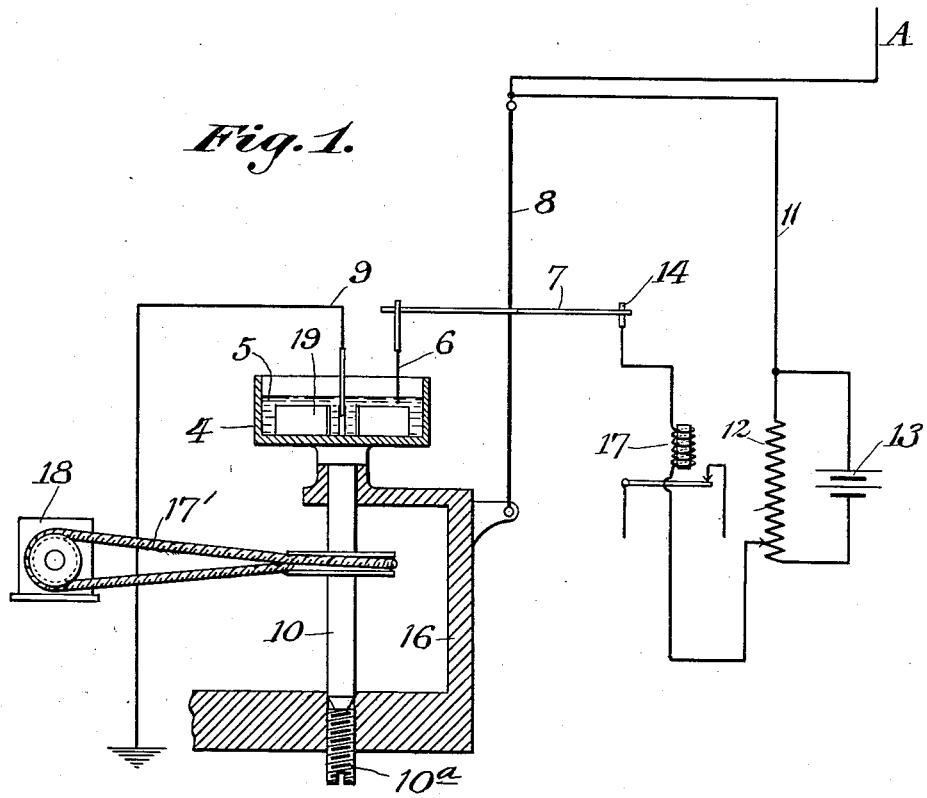
Figure 2:
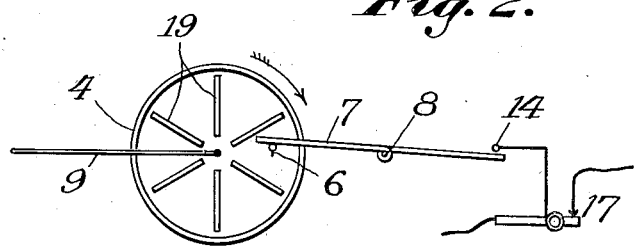
Figure 3:
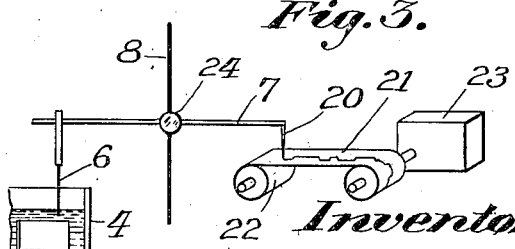

Figure 1 is a diagrammatic view of the apparatus of a receiving station, the cup of liquid being shown in section. Fig. 2 is a plan view of the apparatus. Fig. 3 illustrates a modified mode of recording the received signals.

It has heretofore been known that electromagnetic waves have an effect upon the conductive contacts of various substances, including metal-and-liquid contacts. According to some theories this is due to electrolytic action and according to others it is due to ohmic resistance; in still others a contact of an oil covered liquid metal and a solid metal have been used on the theory that the insulating film between the two is broken down by the waves so as to lessen the resistance of the contact. I have discovered however, that a solid conductor moving in a liquid conductor will have the degree of friction between the two altered by the action of the waves, and I apply this principle to the construction of a very sensitive detecting receiver. Thus, as shown for illustration in the figures, there is provided a vessel 4 for containing a liquid 5 having conductive qualities, and in this liquid is projected a small body such as a barreter wire 6, carried on a light aluminum arm 7, and supported pivotally by a sensitive torsion wire, 8, which conductively connects directly with the aerial A. The liquid 5 is connected to the ground, either by a special wire 9 dipping therein, or by any electric connection to the vessel, as by its supporting shaft 10. The torsion wire 8 is shunted by a circuit consisting of a loop 11 with potentiometer coil 12, and battery or generator 13, and the circuit also includes a contact point 14, for coöperation with the arm 7, and a relay, bell, or other indicating instrument 17, which may be operated by current from the generator 13.

The vessel 4 and its shaft 10 are mounted upon a base 16, and by means of a pulley and band, 17′ or other connection, the motor or clock work 18 keeps the vessel 4 in uniform rotation at the desired speed. The vessel may have baffle plates 19, or other devices to insure the traveling of the liquid with the rotation of the vessel, and the amount of immersion of needle 6 is regulated by screw $10^a$. In this apparatus, the oscillations received in the antenna A would pass to the ground ordinarily by way of the torsion wire 8, arm 7, needle 6, liquid 5 and wire 9,—supposing there was no local circuit, or the contact between the arm 7 and the point 14 is broken. The speed of the vessel is so regulated that the friction of the liquid on the needle 6 will drag it along and turn the arm 7 so that its other end will be out of contact with the point 14. If a signal is received however, the waves cause a change in the condition of friction between the needle 6 and the liquid allowing the torsion stress of wire 8 to swing the arm 7 so as to make contact at 14, whereupon the local circuit is closed and the relay 17 will give a signal. Otherwise, as indicated in Fig. 3, the arm 7 may by its swinging move a recording point 20 over a record tape being translated under it by means of rollers 22 driven by a motor 23, thus making a permanent record of the signals directly. Or again, a small mirror as 24 on the arm 7 may be used in any of the well known galvanometer methods for making the signals. Various other means for detecting the movements of the torsion arm may be used, the essence of the invention being applicable to many forms of specific apparatus, and of course is not limited to that shown.

The invention in its broader aspect, as comprising two relatively moving conductors in frictional contact and indicating means operated by the changes in the frictional stresses due to the passage of oscillating currents therethrough, is not herein claimed, but is claimed in my co-pending application No. 251,538 filed March 22nd, 1905, and its division, No. 269,647 filed July 11th, 1905.

Having thus described my invention and illustrated its use, what I claim as new and desire to secure by Letters Patent, is the following.

1. A receiver for electro-magnetic waves comprising a conducting liquid and a conducting body projecting thereinto, the two having relative motion, means for movably supporting said body so as to balance it against the frictional stress of the liquid, and means for indicating its movements due to alterations in said stress by the waves.

2. In a receiver the combination of a moving liquid, a terminal supported in electrical contact therewith, means to yieldingly mount the terminal to resist the frictional stress of the liquid and means to give a signal when the position of the terminal alters by change in said friction due to electro-magnetic waves.

3. In a receiver the combination of a body of conducting liquid, a terminal mounted in a torsion balance and projecting in the liquid, means to maintain continuous movement of the liquid against the terminal to balance the friction stress, and means to detect movements of the terminal due to waves, substantially as described.

In testimony whereof I have hereunder signed my name in the presence of the subscribed witnesses.

REGINALD A. FESSENDEN.

Witnesses:
JESSIE E. BENT,
ADELEINE WOLEVER.